Oct. 13, 1970     E. T. BAILEY     3,533,822
VITREOUS DECALCOMANIA AND COATED PAPER BASE
Filed June 10, 1968
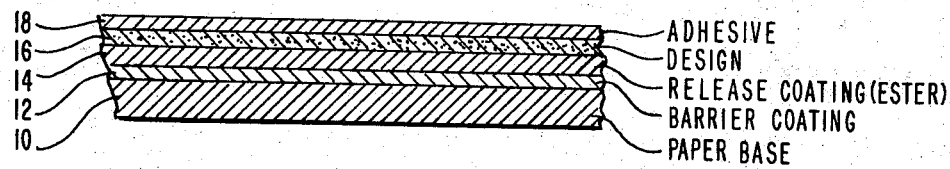

United States Patent Office 3,533,822
Patented Oct. 13, 1970

3,533,822
VITREOUS DECALCOMANIA AND COATED PAPER BASE
Edward T. Bailey, Northumberland, N.Y., assignor to International Paper Company, New York, N.Y., a corporation of New York
Filed June 10, 1968, Ser. No. 735,712
Int. Cl. B41m *3/12;* D21h *1/40*
U.S. Cl. 117—3.4                                        13 Claims

ABSTRACT OF THE DISCLOSURE

Decalcomania suitable for transfer by use of water or heat in the decoration of ceramic articles, incorporating known ceramic or vitrifiable colors in any of the usual vehicles or carriers and embodying known adhesive materials, in which a release layer is provided consisting of an ester, polyethylene glycol monolaurate preferred, instead of the wax or wax-like materials customarily used in such decalcomanias.

BACKGROUND OF THE INVENTION

For the transfer of prepared decorations, indicia and the like, herein generally referred to as "designs," to products such as pottery, porcelain and glassware for example it is well known to provide decalcomanias having a number of characteristics which have developed, over the years, into highly effective combinations meeting quite exacting standards. The "designs" are made up of one or more refractory or vitrifiable pigments or other materials generally referred to as "ceramic colors" carried in organic vehicles and provided with organic adhesive materials by which the ceramic colors may be temporarily adhered to the product to be decorated. They will remain so adhered during firing in the course of which the ceramic colors become fused to the product while the organic vehicles and adhesive are completely destroyed thus leaving the ceramic colors, only, permanently and smoothly fused to the product.

The compositions of the ceramic colors, vehicles and adhesives have been perfected in various combinations by suppliers of such materials and they customarily have been applied by a process, such as silk-screen printing, to a suitably prepared paper base sheet. Preparation of the base sheet most importantly includes the application thereto of a release layer which will soften rapidly and uniformly when the decalcomania is soaked in water for the water transfer process or when the decalcomania is applied to a suitably heated product for the heat transfer process. The nature of the release layer and its behavior with respect to the paper backing and the ceramic colors at the time of transfer is critical to successful utilization of the decalcomanias in commercial production of decorated wares.

In a relatively recent development, as disclosed in U.S. Pat. 2,970,076 granted Jan. 31, 1961, a release layer comprising a wax-like solid, sold for example by Carbon and Carbide Chemicals Corporation under the trademark "Carbowax" has been employed. These materials in general are polyethylene glycols having molecular weights in the range of from 4,000 to 5,000 and having softening points in the range of from about 150° F. to about 350° F.

In another similar development disclosed in U.S. Pat. 3,007,829 granted Nov. 7, 1961, a release layer is provided which consists of a mixture of polyethylene glycols of high molecular weights with relatively smaller quantities of polyethylene glycols of substantially lower molecular weights.

BRIEF DESCRIPTION OF THE INVENTION

The present invention differs essentially from the disclosures of the patents referred to above in that a release layer is provided which comprises one or more esters of polyethylene glycol and which presents specific advantages, in this particular field, over the wax-like release layers heretofore used. A primary advantage of the present invention is that the esters used in the release layer are soluble in a solvent such as toluene. The degree of solubility is such that a solution of very high solids content can be made which can be very easily applied as a thin light-weight continuous layer by almost any simple paper-coating technique. This is in sharp contrast with the wax-like polyethylene glycols which are not soluble in toluene and are only very limitedly soluble in certain organic solvents and thus, as a practical matter, cannot be applied as a coating by the simple techniques available for materials which are readily soluble in low cost solvents such as toluene. Therefore the wax-like material heretofore used ordinarily have been applied to the paper backing by hot melt techniques. Such techniques, in addition to being complicated and expensive to employ, also are virtually incapable of forming a coating of sufficiently continuous nature in anything other than a relatively heavy or thick coating. The excessive thickness of hot-melt coatings is not at all essential to the release function whereby substantial quantities of the hot-melt coating materials are wasted when used as a release layer for decalcomanias. The present invention affords substantial economies in manufacture of such decalcomanias in that much smaller quantities of the release layer material may be used and formed by solution-coating techniques into a layer of adequate thickness and continuity for the release function but with no excessive thickness of wasted materials.

DESCRIPTION OF THE DRAWING

The single figure of the drawing is an enlarged, diagrammatic, vertical sectional view of a typical decalcomania embodying the present invention.

DESCRIPTION OF PREFERRED EMBODIMENTS

Referring now to the drawing an illustrative embodiment of the present invention comprises a paper base layer 10 provided with a barrier coating 12, a release coating 14, a design layer 16 and an adhesive layer 18. As is known in this art the design layer 16 may comprise one or more "colors" and may be unitary or made up of several sub-layers with or without additional sub-layers of adhesive materials. The paper base 10, as is usual in the decalcomania art, serves as a backing for the functional layers or coatings during manufacture of the decalcomania, shipment thereof to point of use and the transfer of the functional elements to the object to be decorated. When transfer occurs the paper base 10 is released and removed leaving the functional elements adhered to the object to be decorated. Release, as is customary, may be accomplished by wetting the assembly with water, for example, or by utilizing heat. The decalcomania of the present invention is adapted for either of these general types of release operations.

The release operation is made possible by the provision of the release coating 14 which, in the present invention, is softenable in water to the extent that it will release the paper base when the decalcomania is wetted and also is sensitive to heat to the extent that it softens at a suitably elevated temperature and thus will release the paper base when the decalcomania is subjected to heat. In order to release properly the material of the release layer 14 should not substantially penetrate into the fibrous body of the paper base 10 when it is softened by water or by heat as the case may be. If such penetration were to occur at the time of release it is possible that the material of the release coating 14 might become discontinuous in zones between the paper and the functional elements to be released and in that event such elements might adhere to the paper with more tenacity than they exhibit with respect to the article to which the functional elements are being transferred. Also, in the interest of economy of materials during the manufacture of the decalcomania the release layer 14 should be a coating which lies substantially intact upon the surface of the paper with little or no penetration into the paper since at least some of any portion which might penetrate is wasted. Accordingly the paper base 10 should be or should be made substantially impenetrable by the material which is to be used as the release coating 14. The paper base 10 may be inherently impenetrable, for example it may be made of glassine, but preferably the paper is made substantially impenetrable by applying thereto a barrier coating 12 as illustrated herein.

The paper base 10 also may be coated or treated on the underside thereof as viewed in the drawing to prevent sticking or blocking between decalcomanias arranged in a stack in shipping containers, for example. This additional treatment becomes necessary in any case wherein the uppermost layer of the decalcomania is constituted of a material which would tend to stick to the raw untreated surface of a sheet of paper. If, for example, the uppermost layer of adhesive 18 is inherently tacky or is likely to become tacky under conditions of moisture or temperature to which the decalcomanias might be exposed during storage and shipment the lower surface of the paper base 10 may be coated with a wax or wax-like substance or indeed may be coated with the same material as that used for the barrier coating 12. An inherently impenetrable paper such as glassine, for example, may or may not require special treatment to prevent blocking depending upon the nature of the uppermost layer of material on the decalcomania.

It will be recognized that the foregoing portions of this description set forth in a general way typical decalcomanias in which a release layer is to be used as well as typical functional requirements which the release layer must meet. It is in environments of the general type just described that the present invention affords a release layer material which not only fulfills the functional requirements but also offers unexpected and valuable economical advantages over the release layer materials heretofore used in this art. To this end the present invention utilizes as the release layer 14 a polyethylene glycol ester or mixtures of such esters. The ester can be of relatively high molecular weight as for example in the general region of 4000 in order to provide a firm coating which will soften with extreme rapidity when moistened with water or when heated to a desired temperature. When more than one ester is employed the molecular weights of the individual esters should be so selected as to give an effective molecular weight to the mixture which lies in the desired range, for example in the range of from about 2000 to about 6000. Alternatively, one or more esters of substantially lower molecular weight may be used provided that some other substance is added to harden the mixture without otherwise adversely affecting its functional properties. A stearic acid amide of relatively high melting point, for example "Armide H T" supplied by Amour Chemical Division, is a suitable hardening additive for an ester or esters of low molecular weight.

A polyethylene glycol monolaurate believed to have a molecular weight of approximately 4000 was obtained from Kessler Chemical Company, identified by that supplier as "Polyethylene Glycol 4000 Monolaurate." This material is soluble in toluene over a very broad range of moderately elevated temperatures and it will form toluene solutions of high solids content. The following Table A sets for the viscosity (Brookfield) of toluene solutions of this polyethylene glycol monolaurate at varying percentages of concentration and at various temperatures.

TABLE A

[Temperature (° F.) vs. Viscosity (cps., Brookfield)]

| Temperature ° F. | Percent solids, PEG monolaurate in toluene | | | | | |
|---|---|---|---|---|---|---|
| | 75 | 60 | 50 | 45 | 30 | 15 |
| 140 | 66 | 24 | | 13 | 5 | 4 |
| 120 | 80 | 24 | 15 | 13 | 8 | 4 |
| 100 | 152 | 32 | 21 | 20 | 8 | 6 |
| 97 | Gel¹ | | | | | |
| | Gel¹ | | | | | |
| 83 | | Gel¹ | | | | |
| 80 | >2000 | >2000 | 27 | 25 | 10 | 7 |
| 76 | | | Gel¹ | | | |
| 75 | | | | Gel¹ | | |
| 68 | | | | | Gel¹ | |
| 64 | | | | | | Gel¹ |
| 60 | | | >2000 | >2000 | 1280 | 43 |

¹ Temperatures at which solids start to gel out of solution.

From Table A it will be readily apparent that toluene solutions of this particular ester having as much as 75% solids have viscosities at 100° or 120° which are low enough for the coating of paper by any one of several of the simple and low cost procedures as will be discussed below. A 50% solids solution has lower viscosities at these temperatures and it has been found that starting with such concentration affords a very long coating-pan life since evaporation of the solvent in the pan, balanced against the incoming 50% solution, will provide a continuing concentration in the pan well within operating demands.

As an example of a practical application of the present invention, polyethylene glycol monolaurate No. 4000 as manufactured by Kessler Chemical Company was procured in a semi solid condition. This material was melted at about 130 to 150° F. and thereafter diluted to a 50% concentration with toluene. The solution was then maintained at a temperature within the range of from 106 to 113° F., its viscosity was around 20 cps. Brookfield and it was pumped to the coating pan of a reverse roll paper coating machine. The coating rolls were pre-heated to 100° F. and the coating operation was started, it being understood that the continuing supply of the warm solution served thereafter to maintain the coating rolls at the desired operating temperature of about 100° F. Under these conditions the coating was applied with no difficulty at a web speed of 300 feet per minute. Drying was effected by passing the web through a zone maintained at about 150° F. and then through zones in which the temperature was about 100° F. The dried web was passed over chilled rolls and conducted to the rewind or slitting operation. By this procedure a film of excellent continuity was formed with coating weights as low as seven pounds per ream (24×36—500).

The paper coated as just described to form the release layer 14 was thereafter printed on the surface of the release layer with conventional ceramic inks and coated with conventional organic lacquers to form the design layer 16 and adhesive layer 18 respectively. The decals thus manufactured were successfully applied to ceramic articles as will be more fully discussed below and the release of the paper backing at the proper moment was consistently achieved.

The paper layer corresponding with the layer 10 utilized in the foregoing example had already been coated by the manufacturer with a barrier coating 12, which in this instance consisted of a conventional starch, clay and casein coating of the type used in the manufacture of tag or label paper.

The relatively low viscosity of 50% toluene solution of polyethylene glycol monolaurate utilized in the foregoing example was admirably suitable for application by reverse roll coating of lightweight continuous films at temperatures only slightly elevated above ambient. The economy, safety and convenience in operation afforded by the present invention is in very sharp contrast with the difficulties encountered when hot melt coating techniques must be used, which frequently is the case with polyethylene glycols of the "wax" type.

From Table A it also will be apparent that for use at moderately elevated temperatures there is a wide choice of high-solids toluene solutions of polyethylene glycol monolaurate suitable for use in air knife, rotogravure, or kiss-roll applications, with or without rod or knife wipe-off, in addition to the reverse roll coating process described above. Because of the relatively small amounts of low-boiling-point solvent in such solutions the drying requirements are desirably low whereby operation at high commercial production speeds in practicable. In the reverse roll coating tests, from which the example above was selected, samples of the barrier-coated paper base were coated with the 50% polyethylene glycol monolaurate solution in toluene in weights varying from about three pounds to about twelve pounds per ream (24×36—500)

The samples with seven pounds or more per ream were entirely satisfactory although quantities in excess of about ten pounds per ream are deemed unnecessary. The coatings below about seven pounds per ream showed some tendency towards discontinuity under the test conditions although it is believed that refinements in the reverse roll technique would produce satisfactory coatings in the five to six pounds per ream range. Similar lightweight coatings should be effective when applied by rotogravure or other processes customarily used for lightweight coatings of other materials.

Coating of the paper with the toluene solutions of polyethylene glycol monolaurate discussed above does not present operational difficulties of the types sometimes encountered with other materials. For example the 50% solids solution used in the example reported above continued to exist as on essentially free-flowing liquid with a viscosity ranging from 25 to 30 centipoises (Brookfield) in the coating pan even though, as noted above, the solids content of the solution in the pans had increased, through solvent evaporation, to about 60%. No rime of soap built up on the coating rolls so long as they remained at the operating temperature of about 100° F. discussed above.

In Table B the viscosity of the polyethylene glycol 4000 monolaurate, identified above (100% solids) at various temperatures is set forth.

TABLE B.—100% SOLIDS PEG MONOLAURATE

[Temperature (° F.) vs. Viscosity (cps., Brookfield)]

| Temperature, ° F. | Viscosity |
|---|---|
| 180 | 176 |
| 170 | 200 |
| 160 | 248 |
| 145 | 280 |
| 135 | 348 |
| 130 | 400 |
| 120 | 500 |

From Table B it will be apparent that the polyethylene glycol 4000 monolaurate can be melted and applied as a coating by conventional hot melt coating techniques if so desired. However, as noted above, a great advantage of this particular material lies in the fact that it can be applied in the form of high-solids solutions in an inexpensive solvent such as toluene by coating techniques which are much more practical and reliable, particularly when lightweight coatings are desired. This material is not soluble in petroleum solvents and therefore presents no bleeding problem when printed with ceramic inks.

From Table B it also is apparent that the release coating provided by the present invention for decalcomanias assumes viscosities, at moderately elevated temperatures, which are low enough to assure rapid release when heat-release operation is carried out. In a typical operation of the latter type an unglazed ceramic article is heated to or permitted to cool to a temperature of about 300° F. and a decalcomania having a release layer 14 of polyethylene glycol ester in accordance with the present invention is pressed by a suitable yieldable platen against the article at such temperature. The adhesive layer 18, if used, or the ceramic design layer 16 is thus pressed into contact with the surface of the ceramic article. After an interval of time, usually accurately and automatically timed, the platen is removed and the released paper base will curl away from the article to be removed, by a blast of air for example. The time interval for the pressing of the decalcomania against the article is very short, usually about 0.1 second in fully automatic operation up to about 0.25 second as a practical maximum. The release layer 14 of the present invention performs its function consistently under such operational conditions.

A particular advantage of the release layer of the present invention appears in the next conventional step in the manufacture of decorated ceramic articles to which a glaze is to be applied over the ceramic ink design. In this operation the decorated article with the paper base 10 removed from and with the design layer 16 adhered to the article, is cooled and dipped into a glaze dip, usually an aqueous suspension of silica. This dip must wet the ceramic surface and the applied designs without splitting of the aqueous film. Since some residue of the release layer 14 usually will remain on the article (except where there is a firing step between decoration and glazing) the release layer material must be readily wettable. Petroleum or carnauba waxes, for example do not meet this requirement. The polyethylene glycol "waxes," being alcohols, are wettable but the polyethylene glycol esters, being soaps, are not only wettable but are surface active and afford completely reliable freedom from film splitting problems.

The decalcomania of the present invention is also entirely satisfactory for use in water-release operations. In such operations the ceramic product to be decorated is cooled, the decalcomania is moistened and applied and the release layer 14, softened by water, permits the paper backing 10 to be slipped off in known manner, leaving the design layer 16 and adhesive layer 18, if used, adhered to the article. The polyethylene glycol ester release layer 14 of the present invention is readily softenable by water but, beyond this, it is surface active whereby it facilitates the squeezing of water from the region between the design and the ceramic article thus assuring rapid smoothing and firm adherence of the design to the article. After the article with applied designs is dried it may be fired or glaze dipped and thereafter fired as desired. When the glaze dip is applied without intermediate firing such residue of the surface active release layer 14 of the present invention as may remain on or in the vicinity of the applied designs will serve to prevent film splitting as discussed above in connection with heat release operations.

For use as a release layer in accordance with the present invention polyethylene glycol monolaurates are preferred because of ready availability at practical price levels in the geographical area in which the present invention was made. However, other esters, such as polyethylene glycol oleates and stearates are useful in the present invention, with appropriate modifications in details if required as a result of differing melting characteristics, available molecular weights and the like. As indicated above such esters, like the monolaurates which may not be sufficiently hard at normal temperatures may be hardened by blending with esters of suitable hardness or with hardening agents such as the high melting point stearamide suggested above.

What is claimed is:

1. A decalcomania having at least one design layer and adhesive material associated therewith for adhering said design layer to an article, a backing member of flexible sheet material, and a release layer disposed between said backing member and said design layer, said release layer consisting of a continuous film of at least one polyethylene glycol ester selected from the group consisting of polyethylene glycol monolaurates, polyethylene glycol stearates and polyethylene glycol oleates.

2. A decalcomania as defined in claim 1 in which said polyethylene glycol ester has a molecular weight such as to be a semi-solid at temperatures ranging up to at least about 100° F.

3. A decalcomania as defined in claim 2 in which said polyethylene glycol ester is a blend of at least two of such esters having a combined molecular weight such that said blend is a semi-solid at temperatures ranging up to at least about 100° F.

4. A decalcomania as defined in claim 1 in which said film additionally contains a high melting point stearamide in quantity sufficient to cause said film to exist as a semi-solid at temperatures ranging up to at least about 100° F.

5. A decalcomania as defined in claim 1 in which said polyethylene glycol ester is polyethylene glycol monolaurate.

6. A decalcomania as defined in claim 5 in which said polyethylene glycol monolaurate has a molecular weight such as to be a semi-solid at temperatures ranging up to at least about 100° F.

7. A decalcomania as defined in claim 5 in which said polyethylene glycol monolaurate is a blend of such monolaurates having a combined molecular weight such that said blend is a semi-solid at temperatures ranging up to at least about 100° F.

8. A decalcomania as defined in claim 5 in which said film additionally contained a high melting point stearamide in quantity sufficient to cause said film to exist as a semi-solid at temperatures ranging up to at least about 100° F.

9. A coated paper for use as a base sheet in the manufacture of printed decalcomanias, said paper comprising a fibrous paper stock having on a surface thereof a continuous layer consisting of at least one polyethylene glycol ester in semi-solid form selected from the group consisting of polyethylene glycol monolaurates, polyethylene glycol stearates and polyethylene glycol oleates and which will melt to viscous liquid form at temperatures within the range of about 120° F. to about 300° F.

10. A coated paper as defined in claim 9 in which said at least one polyethylene glycol ester is polyethylene glycol monolaurate.

11. A coated paper as defined in claim 9 in which there is interposed between said fibrous paper stock and said layer of polyethylene glycol ester a barrier layer of paper-coating material which is substantially impenetrable by said polyethylene glycol ester in melted form and substantially impenetrable by toluene solutions of said polyethylene glycol ester.

12. A coated paper as defined in claim 11 in which said polyethylene glycol ester is at least one polyethylene glycol monolaurate.

13. A coated paper for use as a base sheet in the manufacture of printed decalcomanias, said paper comprising a fibrous paper stock having on a surface thereof a layer consisting of a continuous film of at least one polyethylene glycol ester selected from the group consisting of polyethylene glycol monolaurates, polyethylene glycol stearates and polyethylene glycol oleates mixed with a high melting point stearamide in quantity sufficient to cause said film to exist as a semi-solid at temperatures ranging up to at least about 100° F. and which film will melt to viscous liquid form at temperatures within the range of about 120° F. to about 300° F.

References Cited

UNITED STATES PATENTS

| | | | |
|---|---|---|---|
| 2,494,559 | 1/1950 | Jubanowsky | 117—167 X |
| 2,556,078 | 6/1951 | Francis. | |
| 2,746,877 | 5/1956 | Matthes | 117—3.4 X |
| 2,776,913 | 1/1957 | Anderson | 117—167 X |
| 2,806,804 | 9/1957 | Davis et al. | 117—90 X |
| 2,839,066 | 6/1958 | Sanders | 117—167 X |
| 2,970,076 | 1/1961 | Porth | 156—89 |
| 3,007,829 | 11/1961 | Akkeron | 156—89 |
| 3,065,120 | 11/1962 | Auelar. | |
| 3,067,054 | 12/1962 | Reese | 117—3.4 |

FOREIGN PATENTS 730,649   3/1966   Canada.

WILLIAM D. MARTIN, Primary Examiner

H. J. GWINNELL, Assistant Examiner

U.S. Cl. X.R.

117—3.6, 90, 154

PO-1050
(5/69)

UNITED STATES PATENT OFFICE
CERTIFICATE OF CORRECTION

Patent No. 3,533,822      Dated October 13, 1970

Inventor(s) Edward T. Bailey

It is certified that error appears in the above-identified patent and that said Letters Patent are hereby corrected as shown below:

Col. 4, line 56   "links" should be  --inks--

Col. 7, line 31 (Claim 8) "contained" should be --contains--

SIGNED AND
SEALED
DEC 15 1970

(SEAL)
Attest:

Edward M. Fletcher, Jr.
Attesting Officer

WILLIAM E. SCHUYLER, JR.
Commissioner of Patents